(12) United States Patent
Huffman

(10) Patent No.: US 9,643,802 B1
(45) Date of Patent: May 9, 2017

(54) DROP FRAME TRAILER ROLLER BED

(71) Applicant: Epes Transport System, Incorporated, Greensboro, NC (US)

(72) Inventor: Paul Huffman, Greensboro, NC (US)

(73) Assignee: Epes Transport System, Incorporated, Greensboro, NC (US)

( * ) Notice: Subject to any disclaimer, the term of this patent is extended or adjusted under 35 U.S.C. 154(b) by 199 days.

(21) Appl. No.: 14/526,039

(22) Filed: Oct. 28, 2014

(51) Int. Cl.
*B65G 67/24* (2006.01)
*B60P 7/135* (2006.01)
*B65G 67/20* (2006.01)

(52) U.S. Cl.
CPC .............. *B65G 67/24* (2013.01); *B60P 7/135* (2013.01); *B65G 67/20* (2013.01)

(58) Field of Classification Search
CPC . B60P 7/135; B60P 1/52; B62D 33/04; B62D 33/042; B62D 63/08; B62D 25/2054; B65G 67/20; B65G 67/24; B61D 47/00; B61D 47/005

See application file for complete search history.

(56) References Cited

U.S. PATENT DOCUMENTS

| | | | | |
|---|---|---|---|---|
| 3,040,914 A | * | 6/1962 | Johnson | B65G 63/004 193/35 SS |
| 3,776,400 A | * | 12/1973 | Schwartz | B62D 53/062 280/43.23 |
| 3,796,457 A | * | 3/1974 | Hinchliff | B60P 3/04 296/182.1 |
| 5,915,913 A | * | 6/1999 | Greenlaw | B61D 47/00 187/267 |
| 6,099,220 A | * | 8/2000 | Poth | B60P 7/08 410/121 |
| 7,114,905 B2 | * | 10/2006 | Dibdin | B60P 1/02 414/495 |
| 2004/0247422 A1 | | 12/2004 | Neumann et al. | 414/529 |
| 2010/0129185 A1 | | 5/2010 | Hanson, Jr. | 414/477 |

FOREIGN PATENT DOCUMENTS

| | | | | |
|---|---|---|---|---|
| CA | 2063180 | | 5/1993 | B65G 67/02 |
| NL | EP 0282122 A1 | * | 9/1988 | B60P 1/52 |

* cited by examiner

*Primary Examiner* — Glenn Myers
(74) *Attorney, Agent, or Firm* — MacCord Mason PLLC

(57) ABSTRACT

A vehicle for conveying racks of goods includes a drop frame trailer having an interior with a rear floor and a front floor, the rear floor being lower than the front floor. An anti-friction device (an array of rollers mounted to the front floor) slopes upwardly to the trailer front. A stop on the front floor is resiliently movable from a first position to a second position, the first position extending vertically above tops of the rollers, and the second position being lower than the first position. A forklift can position a rack of goods on the anti-friction device on the front floor, with the rack depressing the stop from the first position to the second position as the rack is positioned until an opening in the rack is positioned above the stop. The stop can counter a gravitational force which would cause rack movement down the anti-friction device.

12 Claims, 3 Drawing Sheets

DROP FRAME TRAILER ROLLER BED

BACKGROUND OF THE INVENTION

The present invention relates to an improved trailer or other vehicle body to haul goods such as industrial parts loaded on racks. Drop frame trailers have inside decks of two elevations. Typically, the front floor or deck is at a higher elevation than the rear floor or deck. As seen in FIG. 1, the conventional truck body has a landing gear 18 under the front or nose deck and the wheel carriage 16 is under the rear floor or deck 12. This type of trailer is often loaded and unloaded using forklifts in a relatively efficient fashion. However, moving such heavy loads with a forklift can be hazardous to workers walking in the trailer, unguarded by the cab of the forklift. Also the nose deck of the trailer can be quite deep, causing problems of accessibility by forklifts that travel on the rear, lower deck. The forklift enters the trailer by the rear doors and travels on the lower deck, and cannot go forward onto the nose deck. The accessibility problem is exacerbated if the nose deck has enough length to provide room for two racks to be loaded, one behind the other. Since the forks of the forklift can only reach one rack at the edge of the nose deck, they cannot reach far enough into the nose. As a result, conventionally, a rack can only be carried on the rear edge of the nose, leading to a waste of haulage space in the forward part of the nose.

SUMMARY OF THE INVENTION

The present invention fulfills one or more of these needs in the art by providing a vehicle for conveying racks of goods including a drop frame trailer having an interior with a rear floor and a front floor, the rear floor being lower than the front floor, an anti-friction device such as an array of rollers mounted to the front floor at an incline to slope upwardly to a trailer front, at least one stop on the front floor that is resiliently movable from a first position to a second position, the first position extending vertically above tops of the rollers, and the second position being lower than the first position, whereby a forklift can position a rack of goods on the roller array on the front floor, with the rack depressing the stop from the first position to the second position as the rack is positioned until an opening in the rack is positioned above the stop, and the stop can resiliently move to the first position into the opening in the rack and engage the rack to counter a gravitational force which would cause rack movement down the roller array.

The stop may be spring-biased to the first position. The stop may be a plate that is mounted to the front floor by a hinge, the plate extends forwardly of the hinge, and a spring biases the plate toward the first position.

Preferably, the roller array is long enough to allow two racks to be positioned on the array. Also, preferably, the front floor has two roller arrays positioned laterally of one another, and each of the two roller arrays has a stop. In a preferred embodiment the front floor has a rearwardly-extending ledge that is spaced above a front portion of the rear floor.

The array of rollers typically includes right and left ranks of rollers that rotate about a common right-left axis.

The invention can also be considered as an apparatus to install in a drop frame trailer for conveying racks of goods having an interior with a rear floor and a front floor, the rear floor being lower than the front floor. The apparatus includes a base for the front floor to form an upward slope, an array of rollers mounted to the slope, at least one stop for mounting above the front floor that is resiliently movable from a first position to a second position, the first position extending vertically above tops of the rollers, and the second position being lower than the first position. When the base, array of rollers and stop are mounted to the trailer, a forklift can position a rack of goods on the roller array on the front floor, with the rack depressing the stop from the first position to the second position as the rack is positioned until an opening in the rack is positioned above the stop, and the stop can resiliently move to the first position into the opening in the rack and engage the rack to counter a gravitational force which would cause rack movement down the roller array.

The invention can also be considered as a method of loading racks of goods on a drop frame trailer with a forklift by lifting and transporting a first rack through a rear trailer door toward an elevated front floor of the trailer, positioning the first rack on an array of rollers that slopes toward the front upward of the front floor of the trailer and holding the first rack on the array by engaging an upwardly-extending stop with a lower component of the first rack to hold the first rack on the sloping array of rollers, lifting and transporting a second rack through the rear trailer door toward the elevated front floor of the trailer, and positioning the second rack on the array behind the first rack by pressing the second rack against a rear of the first rack to force the first rack up the sloped array of rollers until the stop engages a lower component of the second rack.

The method may include loading additional racks on a rear floor of the trailer behind the front floor. Typically, the trailer has two arrays of rollers on the front floor and two racks are loaded on each array. The lifting, transporting and positioning steps are preferably all carried out using a forklift without requiring a human to walk in the trailer.

The method may also include unloading the trailer by lifting the second rack above the front floor with a forklift to clear the stop, backing the forklift from the front floor and allowing the first rack to move down the sloped array of rollers on the front floor until the first rack engages the stop. Then the second rack is removed from the trailer. The first rack is lifted above the front floor with a forklift to clear the stop, and the forklift is backed from the front floor to remove the first rack from the trailer.

Pressing the second rack against a rear of the first rack to force the first rack up the sloped array of rollers until the stop engages a lower component of the second rack may include urging a hinged plate downward against a biasing force by sliding a part of the second rack over the hinged plate until the part of the second rack clears the plate, so the biasing force forces the plate upward, so that the plate can bear against the lower component of the second rack.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
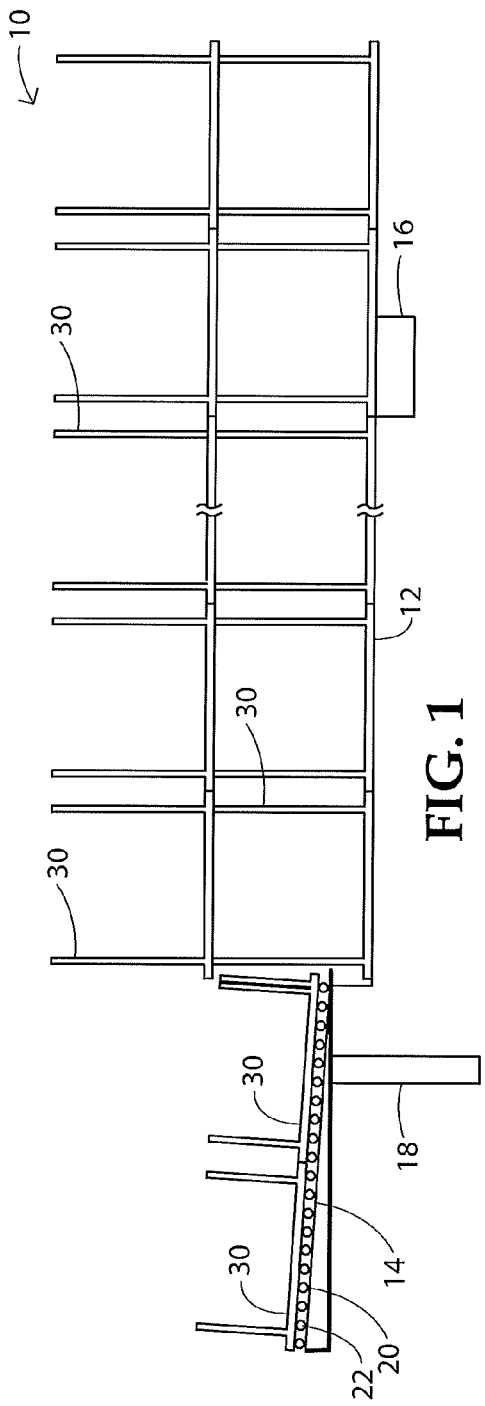
FIG. 1 is a side schematic view of the inside of the trailer showing the upper and lower decks and an array of racks in accordance with an embodiment of the invention.

FIG. 1 shows an interior 10 of a trailer fully loaded in accordance with a preferred embodiment. As used herein "trailer" includes not only a trailer to be pulled by a removable tractor, but also a truck body that is unitary with the driver's cab. The load is a full complement of racks 30, including in the view of FIG. 1, two racks 30 on the upper or nose deck 14 and fourteen racks 30 on the lower deck 12. On lower deck 12, the racks 30 can be stacked two high. As is conventional, the trailer has its doors at the rear for loading and unloading, so that forklifts travel from the rear towards forward parts of the trailer repeatedly in the loading and unloading process.

Figure 3:
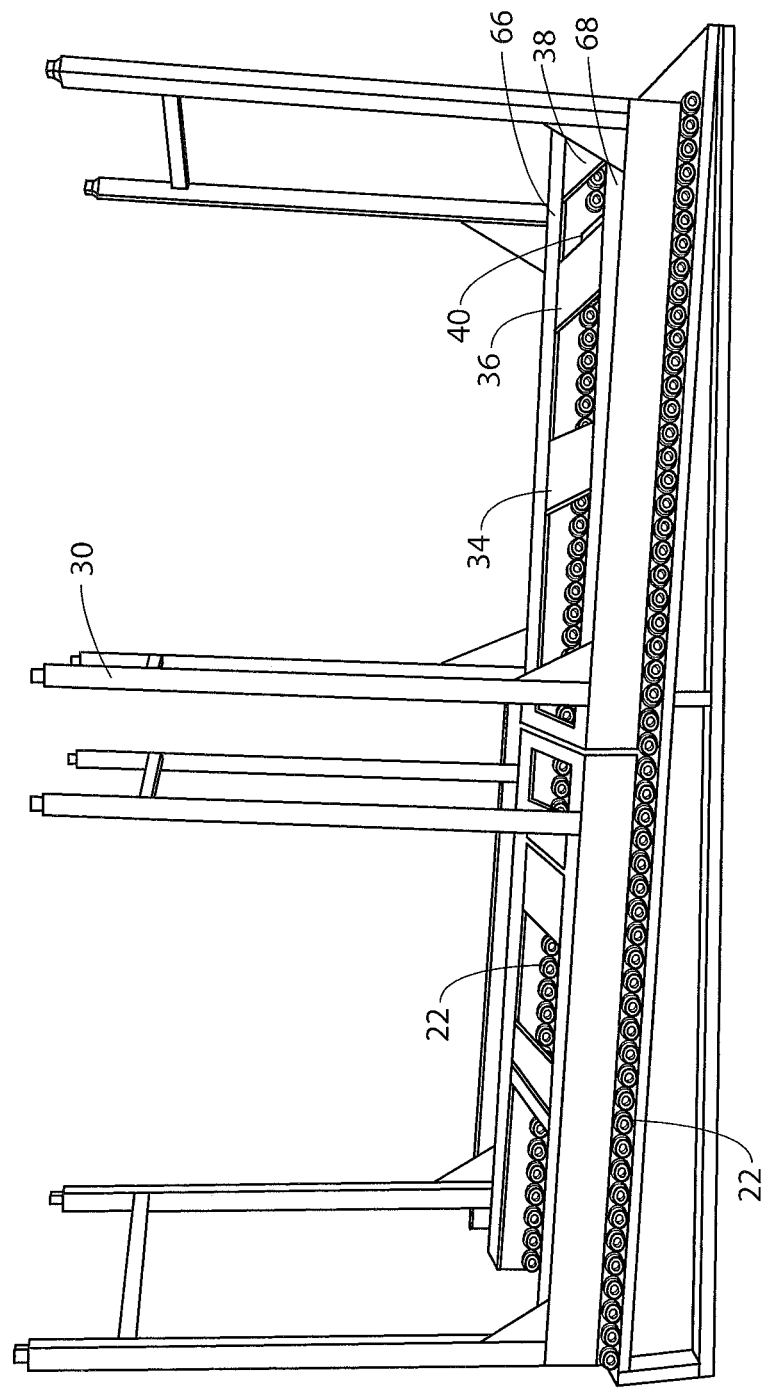
FIG. 3 is a perspective view showing a slope to be fitted into a trailer nose with rollers and exemplary racks.

FIG. 3 shows the racks more completely. Each rack 30 has a base with two parallel spaced apart channel housings or tubings 66 and 68 that are sized and positioned to be able to receive the forks of a forklift. Spanning the tubings 66 and 68 are a plurality of webbings 34, 36 and 40. Superstructures are built upon the resulting rack base.

Figure 2:
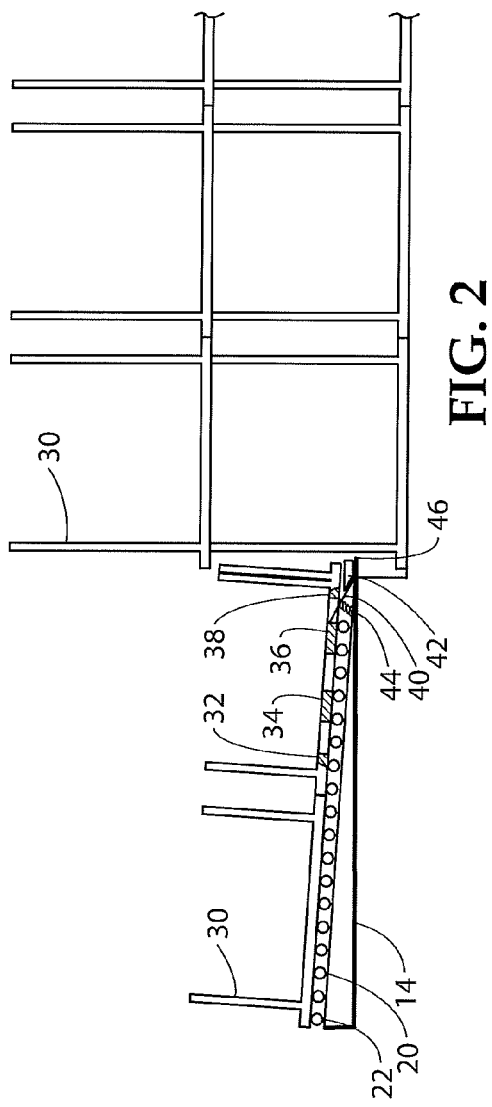
FIG. 2 is an enlarged, partially sectional view of the nose of the trailer of FIG. 1.

As seen in FIG. 2, the nose deck 14 is built up to an incline of about 6 to 8 degrees to form a raised floor 20, with the higher end being at the forward part of the nose. A series of arrays of anti-friction devices such as rollers 22 is positioned on the raised floor 20. The roller arrays are spaced apart a suitable distance to receive the tubes 66 and 68 on respective pairs of roller arrays. Further, as seen in FIG. 2, a latch or stop in the form of a plate 40 is positioned towards the rear end of the sloping deck 20 and pivotally connected at 42. A compression spring 44 beneath the plate 40 acts to force the forward edge of the plate 40 upwardly, but the plate 40 can be pressed downwardly so it pivots about the hinge 42 by the application of a force, such as by one of the cross members 32, 34, 36 or 38 of a rack. Preferably a wedge 46 is positioned to prevent undue upward flexure of the plate 40. The plate 40 extends up into the resulting opening between the tubes 66 and 68 and ones of the cross members. As seen in FIG. 3, plate 40 bears against cross member 36. If the forklift operator lowers the rack differently, the plate may bear against another of the cross members.

Other anti-friction devices can be used instead of rollers, including a surface that is coated, impregnated with, or supports a coating such as nylon, high density polyethylene, Teflon (Registered Trade Mark), or other such material which acts to reduce the impedance to the slidability of the racks on the floor of the nose. Other anti-friction devices can be ball-shaped rollers, or an endless belt mounted on spaced-apart rollers on the floor of the nose. Varying the degree of friction reduction may be accompanied by varying the slope of the front floor.

Although the spring 44 is shown as being a compression spring under the plate 40, other spring geometries can be used. Other configurations of latches or stops can also be used, as long as the stop can be activated/deactivated without requiring the forklift operator to dismount the forklift or for another worker to be in the trailer unprotected. Other stop configurations can include other mechanical or electro-mechanical devices that can prevent the uncontrolled downward movement of a rack and yet not inhibit the loading and unloading of the anti-friction devices such as roller arrays of the nose.

In operation, a forklift can enter the rear of the trailer and carry a rack forwardly to the nose deck 14 and lower the rack onto the array of rollers 22. Since the rollers are mounted on the slope 20, there is a tendency for the rack to travel on the rollers rearwardly. However, the pivoting plate 40 rises up and abuts one of the cross pieces, such as cross piece 36, as seen in FIG. 2. Then, a second rack can be loaded onto the trailer in similar fashion. But the second rack is handled by the forklift to abut the first of the racks already on the slope 20 and drive the first rack forward, up the incline 20 until the plate 40 engages the cross piece 36 of the second rack, as seen in FIG. 2. Then the remaining part of the trailer can be loaded with the racks on the lower deck 20. Then, the trailer can be transported in conventional fashion over highways to its destination to be unloaded.

At the destination, a forklift can remove the racks 30 from the lower deck 12. Then, the forklift can remove the racks from the nose of the trailer. To do so, the forklift operator inserts the forks into the tubings 66 and 68 of the lower one of the racks on the nose. Then, the forklift lifts the rack upward until the bottom of the rack 30 is at an elevation above the top of the plate 40. The forklift can then back away, carrying the rack clear of the upper nose deck 14. At this point, the forward one of the two racks in the nose can travel down the rollers 22 until it encounters the hinged plate 40, holding it in place on the upper deck while the forklift removes the rack it is carrying from the trailer and comes back to retrieve the remaining rack on the nose deck. It can be lifted and removed in similar fashion.

Figure 4:
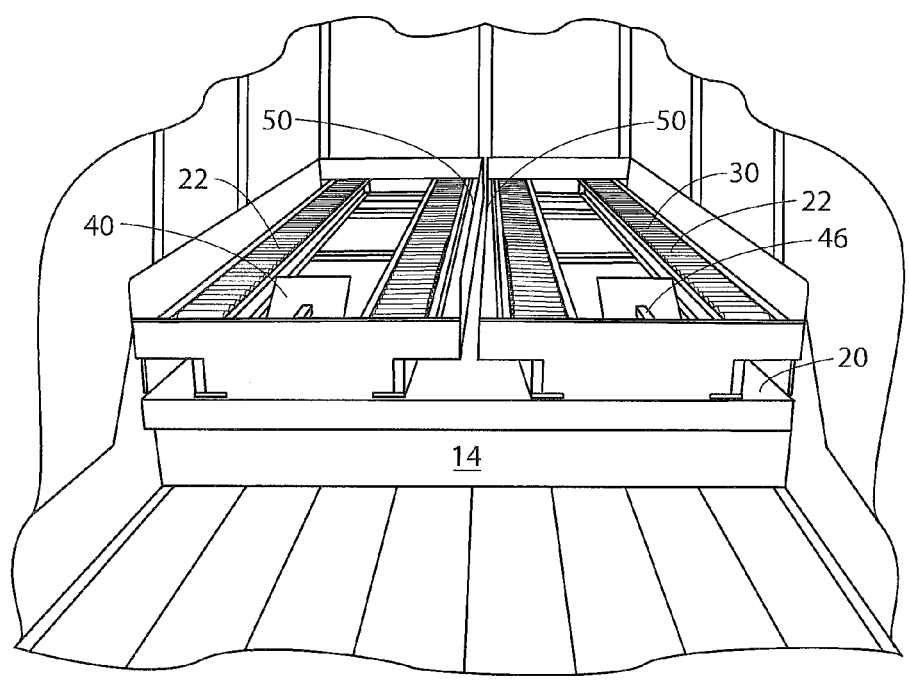
FIG. 4 is a perspective view into the nose of a trailer showing the upper and lower decks and the racks and latches.

Typically, the trailer is wide enough so that in addition to the nose having two racks, front and rear, on the nose, there can be two ranks of racks, right and left, in the trailer. As seen in FIG. 4, each rank has an edge wall 50, to retain racks mounted on the rollers of that rank from migrating to the other rank.

Also preferably, the front floor 14 of the nose is extended rearwardly on the order of 5 inches to have space to fully accommodate the two racks 30. This overhang works fine because the forward racks 30 shown in FIG. 2 on the lower deck provide room for the resulting rearward extension of the racks on the nose deck 14.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A method of loading and unloading racks of goods on a drop frame trailer with a forklift by
    lifting and transporting a first rack through a rear trailer door toward an elevated front floor of the trailer,
    positioning the first rack on an antifriction device that slopes from front to rear on the front floor of the trailer and holding the first rack on the anti-friction device by engaging an upwardly-extending stop with a lower component of the first rack to hold the first rack on the sloping anti-friction device,
    lifting and transporting a second rack through the rear trailer door toward the elevated front floor of the trailer,
    positioning the second rack on the antifriction device behind the first rack by pressing the second rack against a rear of the first rack to force the first rack up the sloped anti-friction device until the stop engages a lower component of the second rack, and
    unloading the trailer by
    lifting the second rack above the front floor with a forklift to clear the stop, backing the forklift from the front floor and allowing the first rack to move down the sloped antifriction device on the front floor until the first rack engages the stop,
    removing the second rack from the trailer, and lifting the first rack above the front floor with a forklift to clear the stop, backing the forklift from the front floor and removing the first rack from the trailer.

2. A method as claimed in claim 1 comprising loading additional racks on a rear floor of the trailer behind the front floor.

3. A method as claimed in claim 1 wherein the anti-friction device is an array of rollers and the trailer has two arrays of rollers on the front floor and two racks are loaded on each array.

4. A method as claimed in claim 1 in which the lifting, transporting and positioning steps are all carried out using a forklift without requiring a human to walk in the trailer.

5. A method as claimed in claim 1 wherein pressing the second rack against a rear of the first rack to force the first rack up the sloped antifriction device until the stop engages a lower component of the second rack includes urging a hinged plate downward against a biasing force by sliding a part of the second rack over the hinged plate until the part of the second rack clears the plate, so the biasing force forces the plate upward, so that the plate can bear against the lower component of the second rack.

6. A method as claimed in claim 1 wherein the anti-friction device is an array of rollers and the trailer has two arrays of rollers on the front floor and comprising loading two racks on each array,
    loading additional racks on a rear floor of the trailer behind the front floor, unloading the trailer by
        lifting the second rack above the front floor with a forklift to clear the stop, backing the forklift from the front floor and allowing the first rack to move down the sloped array of rollers on the front floor until the first rack engages the stop,
    transporting the second rack from the trailer, and
    lifting the first rack above the front floor with a forklift to clear the stop, backing the forklift from the front floor and removing the first rack from the trailer,
wherein the lifting, transporting and positioning steps are all carried out using a forklift without requiring a human to walk in the trailer.

7. A method of loading and unloading racks of goods on a drop frame trailer with a forklift by
    lifting and transporting a first rack through a rear trailer door toward an elevated front floor of the trailer,
    positioning the first rack on an antifriction device that slopes from front to rear on the front floor of the trailer and holding the first rack on the anti-friction device by engaging an upwardly-extending stop with a lower component of the first rack to hold the first rack on the sloping anti-friction device,
    lifting and transporting a second rack through the rear trailer door toward the elevated front floor of the trailer,
    positioning the second rack on the antifriction device behind the first rack by pressing the second rack against a rear of the first rack to force the first rack up the sloped anti-friction device until the stop engages a lower component of the second rack,
wherein the anti-friction device is an array of rollers and the trailer has two arrays of rollers on the front floor and comprising loading two racks on each array, and loading additional racks on a rear floor of the trailer behind the front floor, and
unloading the trailer by
    lifting the second rack above the front floor with a forklift to clear the stop, backing the forklift from the front floor and allowing the first rack to move down the sloped array of rollers on the front floor until the first rack engages the stop, transporting the second rack from the trailer, and
    lifting the first rack above the front floor with a forklift to clear the stop, backing the forklift from the front floor and removing the first rack from the trailer,
wherein the lifting, transporting and positioning steps are all carried out using a forklift without requiring a human to walk in the trailer.

8. A method as claimed in claim 7 comprising loading additional racks on a rear floor of the trailer behind the front floor.

9. A method as claimed in claim 7 wherein the anti-friction device is an array of rollers and the trailer has two arrays of rollers on the front floor and two racks are loaded on each array.

10. A method as claimed in claim 7 in which the lifting, transporting and positioning steps are all carried out using a forklift without requiring a human to walk in the trailer.

11. A method as claimed in claim 7 further comprising unloading the trailer by
    lifting the second rack above the front floor with a forklift to clear the stop, backing the forklift from the front floor and allowing the first rack to move down the sloped array of rollers on the front floor until the first rack engages the stop,
    removing the second rack from the trailer, and
    lifting the first rack above the front floor with a forklift to clear the stop, backing the forklift from the front floor and removing the first rack from the trailer.

12. A method as claimed in claim 7 wherein pressing the second rack against a rear of the first rack to force the first rack up the sloped array of rollers until the stop engages a lower component of the second rack includes urging a hinged plate downward against a biasing force by sliding a part of the second rack over the hinged plate until the part of the second rack clears the plate, so the biasing force forces the plate upward, so that the plate can bear against the lower component of the second rack.

\* \* \* \* \*